Nov. 1, 1966    A. GREENFIELD    3,282,529
SEAT BELT RETRACTOR
Filed May 25, 1964
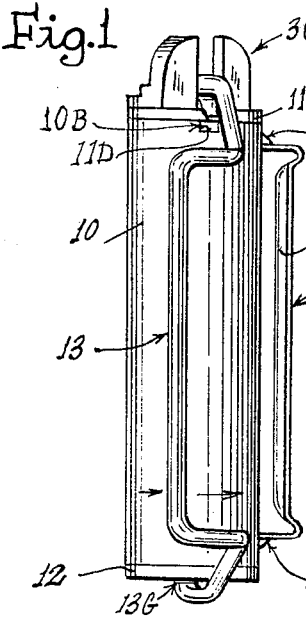
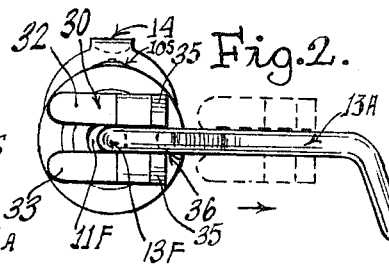
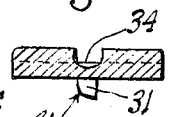
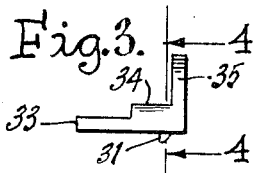
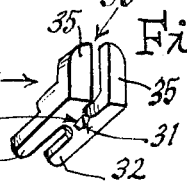
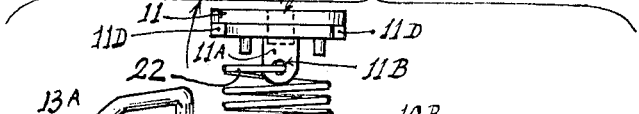
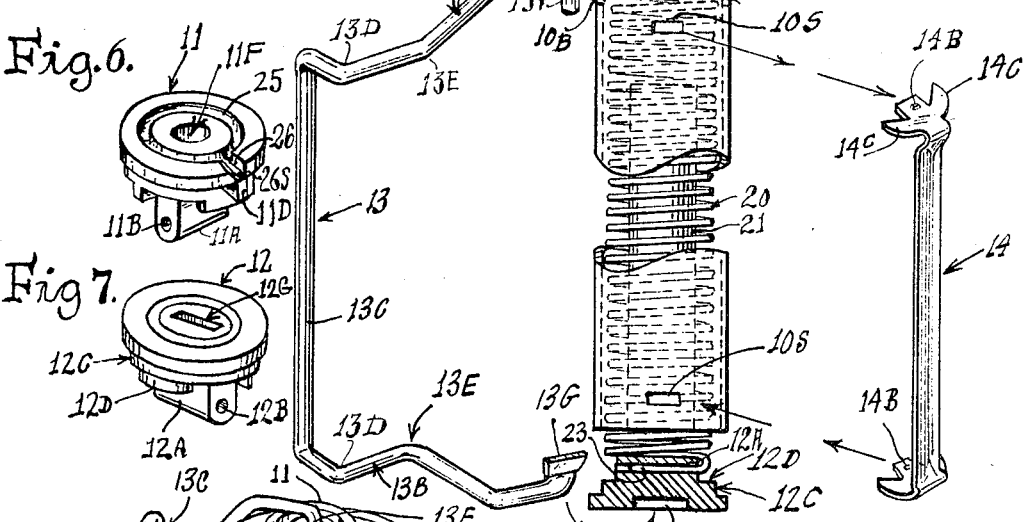
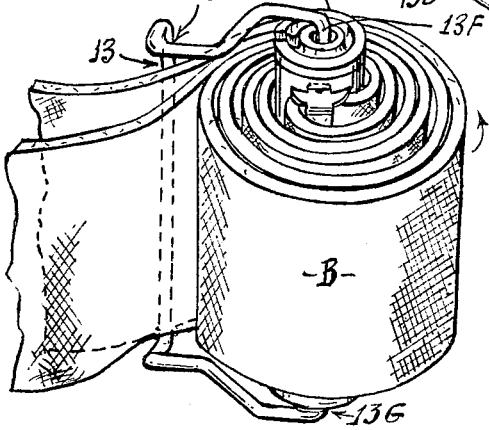
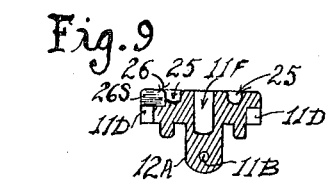
INVENTOR.
ALEC GREENFIELD
BY
ATTORNEY.

_United States Patent Office_

3,282,529
Patented Nov. 1, 1966

3,282,529
SEAT BELT RETRACTOR
Alec Greenfield, Chicago, Ill., assignor to The Greenfield Company, Elk Grove Village, Ill., a corporation of Illinois
Filed May 25, 1964, Ser. No. 369,936
16 Claims. (Cl. 242—107.11)

This invention relates to automotive seat belts and devices for winding the same out of the way when not in use, commonly referred to as "seat belt retractors," and more particularly to the form of retractor which is applied to and carried by the belt itself at a point approximately midway between the fixed end of each belt section and the appertaining buckle element.

Retractors of the class described are known in forms which comprise a small cylinder containing spring means which is under tension to wind the belt upon itself about the cylinder with the aid of a form of torque arm loosely looped around the belt webs so as to remain relatively stationary while the cylinder rotates and pulls the belt webs around with it through the loop of the torque arm. Such retractor mechanisms have assumed a variety of forms differing one from another in details pertaining especially to the form and mode of operation of the looped torque arm and its cooperative attachment with the cylinder and spring means, all such devices having the characteristic that the spring means employed must be pre-wound before the belt is applied or in order to be able to wind-in the belt. Such devices usually also require some form of anchoring means for attaching the belt web to the rotatable cylinder so that the web will wind about the cylinder as it is turned by the pre-tensioned spring whenever the belt is free to be reeled in.

The present disclosures relate particularly to improvements in an end cap structure for operatively attaching the looped belt tongue or torque arm to the winding cylinder, to means for anchoring the belt web to the cylinder, and to a simple ratchet means which is readily attached to or removed from an endwise part of the retractor cylinder to aid in holding the spring against unwinding while it is being tensioned and/or while the belt is being engaged with the retractor or the retractor applied to the belt.

It is a further feature of the invention disclosed to provide a novel end cap construction closing the ends of the spring cylinder and drivingly connecting the spring ends therewith.

Another feature relates to the provision of a simple belt-anchoring snap-in strap removably engaging in snap-action with simple slot means on the cylinder wall and serving to hold the belt web against said wall.

Another important feature relates to the provision of a ratchet means including a simple, one-piece holding dog which can be very economically molded and can be discarded if desired after it has served its purposes in either holding the retractor spring in wound-up condition until the retractor is applied to a belt, or holding retractor spring against retrograde action while it is being wound and while the retractor is being wound and while the retractor is being applied to a belt.

It is a further object and feature of the invention to afford a disposable holding dog and ratchet means which is operable in position against an end of the reeling cylinder to cooperate with a raceway and locking slot formed in an end cap on the cylinder and which has certain bifurcated formations engageable in springing action with parts of the looped belt torque arm, such that the manipulation of the dog in applying or removing it occurs wholly at the end of the cylinder in plain view and away from and not beneath any parts of th belt webbing, as is the case with other forms of ratchet for such devices.

Additional features of novelty and utility relate to details of the construction and operation of the embodiment of the device as described hereinafter and depicted by way of illustrative example in the annexed drawings in which:

FIGURE 1 is a side elevation of the complete retractor with the removable ratchet dog in position;

FIGURE 2 is a top plan view of the device of FIGURE 1;

FIGURE 3 is a side elevation of the removable ratchet dog;

FIGURE 4 is an enlarged cross-section of the dog taken in the direction of lines 4—4 of FIGURE 3;

FIGURE 4A is a perspective view of the dog looking at the bottom;

FIGURE 5 is an exploded view of the retractor components with parts shown in perspective, elevation, and fragmentally;

FIGURE 6 is a perspective view of the fixed dogging end cap;

FIGURE 7 is a perspective view of the rotatable end cap;

FIGURE 8 is a perspective view of the retractor in combination with a seat belt rolled thereon;

FIGURE 9 is a cross sectional view through the end cap of FIGURE 6 detailing the radial slot and race.

Referring to FIGURE 1, the complete retractor comprises a cylindrical housing shell 10 provided with opposite end cap closures 11 and 12 having the general construction shown in FIGURES 6 and 7 and insertable into the respective open ends of said shell.

Engaging the two end caps is a large open-looped belt tongue 13, and removably engaging the side wall of the shell is a belt-anchoring strap 14 through which the belt web is passed so that when the cylinder shell is spring rotated by means to be described, the belt B will be wound about the shell with the aid of the looped tongue or bail in the manner depicted in FIGURE 8.

So long as the seat belt is properly engaged with the retractor, the simple reeling mechanism is maintained in operative condition with its driving spring always under tension to reel in the belt web when the latter is not in use and free to be wound in.

Should the belt be removed entirely from operative engagement with the retractor and then reattached thereto, or in the case where the retractor is to be newly applied to a belt, the drive spring must be wound up to proper tension before attaching the belt, and relative rotation between the shell and the looped tongue must be effected to wind up the spring, in which condition it becomes inconvenient even by exercise of some skill to manipulate the belt for attachment while preventing the spring from unwinding.

To avoid this difficulty, a special removable holding dog means of optionally disposable character is provided as an auxiliary attachment to the retractors to maintain them in pre-wound condition as they come from the factory, so that it is only necessary for the purchaser or user to insert the belt web through the looped tongue and beneath the anchoring strap and then remove the dog to free the spring for its proper winding action.

In its more detailed aspects, the construction of the retractor as seen in FIGURE 5 is such that the tongue 13 serves to maintain all of the components except the strap 14 in assembled relation through a spring action of its own, the tongue 13 being of a heavy gauge springy wire stock formed into a bail or U-shaped with upper and lower side arms 13A, 13B joined by a bight 13C offset as at 13D from the plane containing the two arms in the manner illustrated in FIGURE 2. Additional offsets at 13E on both arms serve to shorten the length of the bight so that it conforms more closely to the width of the belt webbing, as seen in FIGURE 8.

The reeling power is derived from a long coil spring 20 (FIGURE 5) provided with a simple plastic tube insert 21 serving as an inner core to silence the spring and prevent internal whipping, buckling and binding when the spring is tightly coiled.

The two end caps 11 and 12 seen in FIGURES 6 and 7 are molded from a suitable plastic and are of identical internal construction with respect to the parts on the undersides thereof fitting into the cylinder shell, particularly in the respect that they are both provided with a diametrically-extending boss or rib 11A, for example, which is provided with a bore 11B to receive the corresponding lateral anchoring end of the coil spring as seen at 22, FIGURE 5, or in the sectional view at the lower end of the cylinder where the spring end 23 lies in the bore of the rib 12A.

Each end cap also has formed on its underside, as at the lower cap 12 in FIGURE 5, a larger annular ledge 12C adapted to fit closely into the cylinder shell, and a smaller ledge 12D adapted to fit into the bore of the coil spring when the end caps are set home.

In order to maintain one of the end caps in fixed position relative to the cylinder, two radial protuberances 11D (FIGURES 5 and 6) are provided on the periphery of larger ledge to fit into notches 10B (FIGURES 1 and 5) of the shell, whereby this end cap 11 is prevented from turning and therefore anchors one end of the coil spring, while the opposite end of the spring is free to turn with its end cap 12 since there are no such stopping lugs or protuberance at this end of the cylinder.

Winding of the spring is effected by holding the tongue 13 stationary to act as a torque arm while rotating the cylinder, the tongue, as in FIGURE 5, having one of its free ends 13F turned inwardly to form an upper spindle part fitting into the bore 11F of the corresponding end cap, as in FIGURES 2 and 8, this particular end cap being the one that is stationary, so that this end 13F of the bail or tongue rotates in the bore of the upper cap 11.

The opposite end of the tongue 13, however, has its free end portion 13G turned inwardly but flattened to key into a diametric slot 12G (FIGURES 5 and 7) formed in the lower end cap, in consequence of which this end cap, which has no stopping lugs, will be forced to rotate with the tongue and will, accordingly, turn and tension the spring which, however, will immediately unwind itself when the tongue or cylinder is freed unless some restraining force is applied, such as the novel holding dog means now to be described.

As viewed in FIGURE 6, the upper end cap 11 is provided with a lug or tooth race 25 extending about the central tongue pivot bore 11F. Communicating with this race is a radial slot 26 which opens into the periphery of this end cap just above one of the radial locking protuberances 11D, both the race and the slot being adapted to receive a ratchet tooth 31, formed on the underside of the simple molded ratchet dog 30, shown in FIGURES 3, 4 and 5, the radial slot 26 permitting the dog to be worked into or removed from operative position on the end cap and the race 25 receiving and guiding the ratchet tooth 31 in circular travel around the end cap with the wire tongue or bail, as will appear.

The radial dog-tooth slot 26 is substantially deeper than the circular race, so that when the dog is pressed down upon the end cap, as it is by action of the tongue, the ratchet tooth 31 will drop into the inner end portion of the radial slot from the race and lock the dog in position against retrograde turning, but the dog may be readily forced to climb out of the slot in the winding direction, as by turning the tongue energetically, the tooth 31 having for this purpose an angled side 31C affording a cam face, as shown in the magnified view of FIGURE 3. While the spring could be wound in either direction in order to procure maximum tension and proper and easy operation of the dog at the same time a directional arrow is stamped upon the outside of the cylinder shell to indicate the preferred turning direction for the cylinder, this being also the direction that will present the cam face 31C of the dog to the sloping side of the locking slot 26S so that the dog will climb out of the slot easily and move along the race. About six turns is sufficient for most belts.

When the dog tooth 31 is lying in the circular race the inner end portion of the dog will be slightly elevated because the raceway is not as deep as the ratchet slot 26, but when the tooth snaps down into said slot to lock, the dog will seat flat down upon the end cap 11, as in FIGURE 1.

The ratchet dog 30 may be very inexpensively molded from nylon or other suitable synthetics and can be discarded if desired after the retractor is wound up. As seen in FIGURES 2, 4 and 4A, this dog has an elongated base portion bifurcated partially along its length to provide two parallel prongs 32, 33 spaced apart just sufficiently to admit between them the diameter of the inturned pivot end 13F of the tongue, as in FIGURE 2, these two prongs being joined by a cross web 34 from which projects upwardly a bifurcated handle portion comprising two spaced tabs or fingers 35, the slot portion 36 spacing them being also sufficient to admit a portion of the tongue arm adjoining the bend 13E so that the dog can have clearance to be forcibly rocked off the end cap when it is to be removed, as indicated by the dotted lines in FIGURE 2.

Thus, in order to remove the dog from its full-line position on the end cap, as in FIGURES 1 and 2, it is pulled toward the viewer (FIGURE 1) or toward the right (FIGURE 3) to withdraw the tooth 31 from the end of the radial slot 26 and in the general direction indicated by the dotted lines in FIGURE 2, the bifurcated clearance slot 36 between the two fingers permitting the dog to follow downwardly the bend in the wire tongue until it rocks off the end cap.

In order to apply the dog before or after winding the spring, the belt tongue 13 is stopped with the upper arm portion 13A aligned with the radial dog slot 26 and the bifurcated prongs in the foot and finger portions of the dog are fitted with the wire with the two foot prongs 32, 33 angling up upon the end cap and the dog tooth working into the radial slot 26, a final push against the spring action of the tongue causing the dog to act as a lever and spring the end of the wire sufficiently up from its pivot seat 11F at this end to permit the dog to seat fully flat upon the end cap, as in FIGURES 1 and 2.

When the dog is positioned as aforesaid the spring may be wound as tightly as desired by the relative turning of the cylinder and tongue, as previously described, the dog tooth turning into the circular race with a tilting action on the dog member and then settling into the locking or holding slot 26 with each complete turn.

The seat belt may be applied by slipping the appropriate free end through the loop of the torque tongue 13, the belt anchoring strap 14 having been or now being removed so that the belt web may be captured therebeneath.

The anchoring strap 14 is a simple length of steel of suitable springiness bowed laterally between its free ends to give it rigidity, as at 14A, FIGURE 1, and having said ends offset at right angles and a trident form applied thereto to afford a central tang having an embossed locking boss 14B flanked by two angled tangs 14C adapted to fit snugly against the curvature of the cylinder in the manner seen particularly in FIGURES 2 and 8, whereby to stabilize the strap in seated condition on the cylinder to turn with the latter through the tongue loop 13, the two offset ends of the anchoring strap 14 being identical in these respects.

Means for snap-action seating of the anchoring strap comprises the provisions of longitudinally spaced strap-seating slots 10S (FIGURES 1 and 5) on the cylinder, the respectively outermost lips of these slots (nearest the end caps) being raised to form a slight locking hook (FIGURES 1, 2 and 8) beneath which the locking bosses 14B will catch, the metal strap having sufficient spring to set and secure these bosses in a snap-in locking engagement with said lips and to require a slight bowing of the strap to disengage it from the cylinder.

Thus, when the reeling spring has been suitably wound with the aid of the holding dog means in the manner aforesaid, and the belt has been properly fitted through the tongue loop 13, the anchoring strap 14 may be snapped into engagement with the cylinder with the belt web captured beneath it, the retractor then being in readiness for removal (and discard if desired) of the dog 30 by the simple manipulation heretofore explained. If there is to be occasion for removing the retractor at some later time, as for the purpose of cleaning the belt, etc., the dog may be saved and reapplied, its principle use, however, being to secure the retractor spring in fully wound-up condition as the device leaves the factory in order to save the user the inconvenience and time to wind the device and manipulate the belt into engagement therewith without the aid of any ratchet or other holding means. When the belt has been properly applied and the dog removed, the retractor will wind the belt into a compact bundle, such as depicted in FIGURE 8.

Various modifications of the preferred construction described for purposes of illustration, will occur to those skilled in the art and can be made within the provisions of the appended claims, it being contemplated that useful results may be obtained without departing from the invention by omitting, for example, the circular raceway 25 for the tooth 31 in which case the seating of the dog on the end cap may tend to wear the tooth unduly and necessitate use of a harder plastic if the dog is to be used repeatedly, omission of the raceway also tending to make the tile of the dog very pronounced.

I claim:

1. In a seat belt retractor of the type including a cylinder with opposite open ends, end caps seated in said ends, one cap being fixed in position and the other rotatable in its seat, there being a coil spring to be tensioned within the cylinder and having opposite ends respectively attached to said end caps, improvements comprising, namely: the provision of a bail affording a wide belt-passing tongue loop and having opposite pivot ends offset to engage each in one of said end caps, one of said pivot ends turning freely in the fixed one of said caps and the other pivot end being keyed into the corresponding end cap which is free to rotate so as to turn therewith; a belt-capturing strap engaged with the outside of said cylinder but of a size to pass freely beneath the loop of said bail and wind the belt about the cylinder responsive to action of said spring in turning the cylinder but of a size to pass freely beneath the loop of said bail and wind the belt about the cylinder responsive to action of said spring in turning the cylinder while said tongue loop provides a torque arm permitting the cylinder to rotate relative thereto; and means providing a ratchet dog to hold said cylinder and tongue against relative rotary displacement by the spring until freed, said means comprising a dog member having slot formations interfitting with pivotal end portions of said bail at a particular one of said end caps, said dog having a portion seating against said particular end cap, a raceway circumambient of the pivotal center of the bail in said end cap, a dog-locking slot extending radially from said raceway through the peripheral margins of said end cap, said slot being deeper than said raceway; a ratchet tooth on said seating portion of the dog and of a depth and size to fit into said raceway and said locking slot and such that when the tooth is in the raceway, the dog can turn with said bail and the dog will drop into said slot when aligned therewith by such movement and hold the tongue against retrograde motion by the spring, said tongue exerting a spring action against the dog at the aforesaid interfitting regions therewith whereby the dog tooth snaps into and out of said locking slot.

2. A belt retractor in accordance with claim 1 in which said belt-capturing strap is an elongated member having opposite free ends offset and provided with locking tangs, and said cylinder has longitudinally spaced seating slots near its opposite ends each receiving one of said tangs, said strap having sufficient inherent springiness to forcibly interfit each of the tangs with one of said seating slots in the cylinder, said strap being spaced from the cylinder wall a distance to pass the web of the belt closely therebeneath.

3. The construction of claim 2 further characterized in that said cylinder slots are provided with locking lip formations and the strap tangs are respectively provided with locking embossments engageable with the lip formation of the appertaining slot to interlock therewith such that the strap has a snap-action interlock with said slots.

4. The construction of claim 3 further characterized in that said offset ends of the strap each have additional stabilizing tangs flanking said locking tangs and angled respectively to fit snugly against the external surface of the cylinder on opposite sides of the corresponding locking tangs to stabilize the seating of the strap against the cylinder wall.

5. A retractor structure according to claim 1 further characterized in that said dog is a one-piece molded member of approximately L-shape consisting of a foot portion and a leg portion, said foot portion being adapted to seat upon one of said end caps and being slotted to provide spaced prongs between which the appertaining pivot end of the bail is received, said leg having a bifurcated formation likewise interfitting with parts of said bail to couple the dog rotatively with the bail and permit engaging and disengaging manipulation of the dog relative thereto.

6. In a retractor for seat belts and the like of the type having a cylinder rotatable to wind up the belt thereon, spring means within the cylinder acting to turn the same, means acting to hold the belt with the cylinder for winding therewith, and a belt-engaging torque arm supporting the cylinder with the belt so that the cylinder can rotate relative thereto, improvements in a ratchet means for the torque arm serving to permit the cylinder spring to be held under tension pending attachment of the belt, said improvements comprising, namely: an end cap fixed with an end of the cylinder, and an end cap at the opposite end of the cylinder rotatable relative to the latter; a torque arm in the form of an approximately U-shaped bail having offset free ends axially aligned to engage with one of said end caps as relative pivots for the cylinder, one of said free ends of the bail fitting rotatively into the fixed one of said end caps and the other said end of the bail fixedly engaging the other end cap so as to rotate the cylinder and having opposite ends each engaging with one of said end caps such that relative rotational motion of the end caps will tension the spring; and relative rotational movement of the bail with respect to the cylinder and vice versa will likewise produce relative rotational movement of the end caps to tension the spring; and ratchet means for holding the spring under tension and comprising a dog member fitting against the fixed one of said end caps, said dog member having a portion movable angularly about the pivotal center of the bail portion engaging said fixed end cap, and having another portion engaging the bail to couple the latter to the dog for joint rotative movement with the cylinder relative to the other end cap; and cooperable ratchet slot and tooth parts on the fixed end cap and dog operable to lock the dog releasably against retroactive movement by the spring, said bail exerting a spring action against the dog yieldingly urging the same against the fixed end cap to effect releasable holding engagement of the dog through said ratchet slot and tooth parts so that the spring may be held under desired tension until the dog is caused to release.

7. The construction of claim 6 further characterized in that said dog has removable interfit with the bail and fixed end cap and may be operatively engaged with the retractor or wholly removed therefrom against the said spring holding action and engagement of the bail with the dog.

8. The construction of claim 6 further characterized in that said ratchet slot and tooth formations consist of a ratchet tooth on the dog positioned radially of the center of rotation for the appertaining bail end in the fixed end cap, together with an annular raceway for said tooth in said fixed end cap about said center, and a radial locking slot in the end cap communicating with said raceway and also radially away therefrom through the margins of said end cap so that said tooth may be moved radially inwardly and outwardly into or from engagement with the slot and raceway.

9. The construction of claim 8 further characterized in that said raceway has a depth to receive said ratchet tooth so that the dog is above the level of the raceway, said locking slot being of somewhat greater depth so that the spring action of the bail against the dog urges the latter in a direction against the end cap to force the ratchet tooth into the locking slot when the dog is turned to bring the tooth into alignment therewith.

10. The construction of claim 9 further characterized in that said ratchet tooth has a sloping portion constituting a cam face engageable with said locking slot to facilitate climbing of the tooth out of the slot responsive to application of a turning force thereto sufficient to overcome the spring action of the bail as aforesaid.

11. In a seat belt retractor of the type supported by the belt itself and having a spring-rotated cylinder about which the belt web is wound when the belt is free to move in such action, improvements comprising, in combination: a cylinder having means to secure a portion of the belt web in relatively anchored condition on the side of the cylinder; a torque arm and supporting means at each of the opposite ends of the cylinder supporting said arm for rotary movement about the cylinder while the latter remains relatively stationary, and also permitting rotation of the cylinder while the torque arm is held relatively stationary; spring means within the cylinder acting upon the cylinder and torque arm to produce, when tensioned, relative rotational movement under the conditions aforesaid, said torque arm including a looping portion through which the portions of the belt web to be retracted can move in winding onto and from the cylinder, said looping portions further coacting with the web to carry the retractor and to maintain the torque arm against rotary movement while the cylinder rotates to wind or unwind the belt web; said spring means being adapted to be tensioned for belt-winding action as aforesaid by relatively rotational movement between the cylinder and torque arm in a given direction; and ratchet dog means removably seating upon the aforesaid torque-arm supporting means at one end of the cylinder and coacting with the latter in detent holding action in one particular direction, and having operative engagement with the torque arm to be moved by the latter to wind the spring to tensioned condition in one direction opposite to said particular direction, in a manner and for the purpose to prevent relative rotational displacement between the cylinder and torque arm in the direction which will permit the spring to unwind, whereby to hold the spring in tensioned condition until the dog means is removed.

12. A seat belt retractor having a cylinder about which the belt is wound, a torque arm for supporting the retractor including the drum in coacting relation with the belt web, bearing means in opposite ends of the cylinder to support the torque arm and cylinder for relative rotative movement either with respect to the other, spring means carried by the cylinder and cooperative with the latter and a certain one of said bearing means and the torque arm to produce relative rotative motion as aforesaid when the spring is tensioned by relative rotary motion between the cylinder and torque arm in a certain direction; and ratchet means for holding the cylinder and torque arm against relative rotary movement oppositely to said certain direction to prevent the spring from unwinding, said ratchet means comprising a dog means seatable upon and removable from said certain one of the bearing means and having detent ratchet means cooperable with said certain bearing means and the torque arm to permit relative rotary motion between the cylinder and torque arm in a direction to tension the spring but not in the opposite direction, said dog means being urged and removably held in seated condition upon the certain one of the bearing means as aforesaid by a portion of the torque arm.

13. In a seat belt retractor of the type having a cylinder on which the belt web is wound and unwound, end plugs in the opposite ends of the cylinder, a torque arm pivotally supported by said end plugs so that the cylinder and arm can rotate one with respect to the other, spring means acting on the cylinder and arm when tensioned in one direction to produce relative rotation as aforesaid in the opposite direction, the combination of a unitary throw-away ratchet dog seating upon a certain one of said end plugs and removably held thereon by, and held in engagement with a part of said torque arm, and coacting ratchet means on said ratchet dog and said certain end plug permitting relative rotational displacement between the cylinder and torque arm in a certain direction to tension said spring means, but preventing such displacement by action of the spring means in retrograde direction opposite from said certain direction.

14. A combination according to claim 13 further characterized in that said ratchet dog has a recessed portion interfitting with a part of the torque arm to couple the latter with the dog, and the dog is further provided with a protuberant tooth urged against said certain end plug and said end plug has a detent recess receiving said tooth to prevent retrograde displacement as aforesaid.

15. The construction defined in claim 14 further characterized in that said certain end plug has a slot communicating from the margin thereof radially into said detent recess to facilitate seating of the dog as aforesaid.

16. The construction of claim 15 further characterized in that said certain end plug has an annular groove intercepting said detent recess to receive said tooth and permit the dog to fit close down upon said plug while rotating about the center of said groove into and out of said detent recess.

References Cited by the Examiner

UNITED STATES PATENTS

| | | |
|---|---|---|
| 1,313,644 | 8/1919 | Simon. |
| 3,223,236 | 12/1965 | Troendly _____ 242—107.11 X |

FOREIGN PATENTS

| | | |
|---|---|---|
| 809,901 | 8/1951 | Germany. |

FRANK J. COHEN, *Primary Examiner.*

W. S. BURDEN, *Assistant Examiner.*

UNITED STATES PATENT OFFICE
CERTIFICATE OF CORRECTION

Patent No. 3,282,529                                  November 1, 1966

Alec Greenfield

It is hereby certified that error appears in the above numbered patent requiring correction and that the said Letters Patent should read as corrected below.

Column 1, line 60, strike out "and while the retractor is being wound"; column 3, lines 58 and 59, for "FIGURES 3, 4, 5" read -- FIGURES 3, 4, 4(a) --; line 73, for "FIGURE 3" read -- FIGURE 4 --; column 4, line 33, for "3" read -- 2 --; column 5, line 36, for "tile" read -- tilt --; lines 54 to 56, strike out "but of a size to pass freely beneath the loop of said bail and wind the belt about the cylinder responsive to action of said spring in turning the cylinder"; column 8, line 1, for "drum" read -- cylinder --.

Signed and sealed this 3rd day of December 1968.

(SEAL)
Attest:

EDWARD M. FLETCHER, JR.                  EDWARD J. BRENNER
Attesting Officer                          Commissioner of Patents